Emanuel Briguglio
Richard F. Norris
INVENTORS

United States Patent Office 3,496,651
Patented Feb. 24, 1970

3,496,651
VARIABLE FORCE SERVO-SYSTEM FOR CONTROL LOADING
Emanuel Briguglio, Silver Spring, and Richard F. Norris, Rockville, Md., assignors, by mesne assignments, to the United States of America as represented by the Secretary of the Navy
Filed July 27, 1967, Ser. No. 656,990
Int. Cl. G09b 9/08
U.S. Cl. 35—12                                     7 Claims

ABSTRACT OF THE DISCLOSURE

A control stick loading system for simulating force/feel characteristics of a control stick in a simulator for an aircraft, the system comprising a torosion bar connected to the control stick, a displacement potentiometer connected to the torsion bar so as to provide a first voltage representative of the angular displacement between the ends of the bar, a multiplier potentiometer supplied with reference voltages corresponding to velocity of the simulated aircraft, the multiplier potentiometer being responsive to displacement of the control stick to provide a second voltage, summer means connected to the potentiometers for summing the first and second voltages to provide an error voltage, servo-motor and gear means connected to the torsion bar and responsive to the error voltage to change the angular displacement between the ends of the bar in a direction tending to reduce the error voltage.

BACKGROUND OF THE INVENTION

Heretofore, the simulation of "force-feel" characteristics of aircraft controls in flight simulators has been accomplished through the use of springs, pneumatics, hydraulics, magnetic clutches, and friction devices both in their simple forms and in combinations with electronic force transducers that result in closed loop servo systems. The principle disadvantages of these older systems are false "feel" characteristics for the simpler systems and great expense for the highly sophisticated ones.

SUMMARY OF THE INVENTION

The general purpose of this invention is to provide continuously variable "force-feel" characteristics representative of aircraft flight control systems.

A principal object of the invention is to provide simulated of artificial control forces with a minimum of electronic controls, hardware, and attendant expense.

Another object of the invention is the provision, for use in a flight simulator or the like, of a variable force control loading system that is more authentic in force-feel characteristics than simple springs yet is not as sophisticated as those utilizing hydraulic servos or magnetic particle actuator servos.

BRIEF DESCRIPTION OF THE DRAWING

The invention may be further said to reside in certain constructions and arrangements of parts described more fully hereinafter with reference to the accompanying sheets of drawings forming a part of this specification, and in which.

Figure 1:
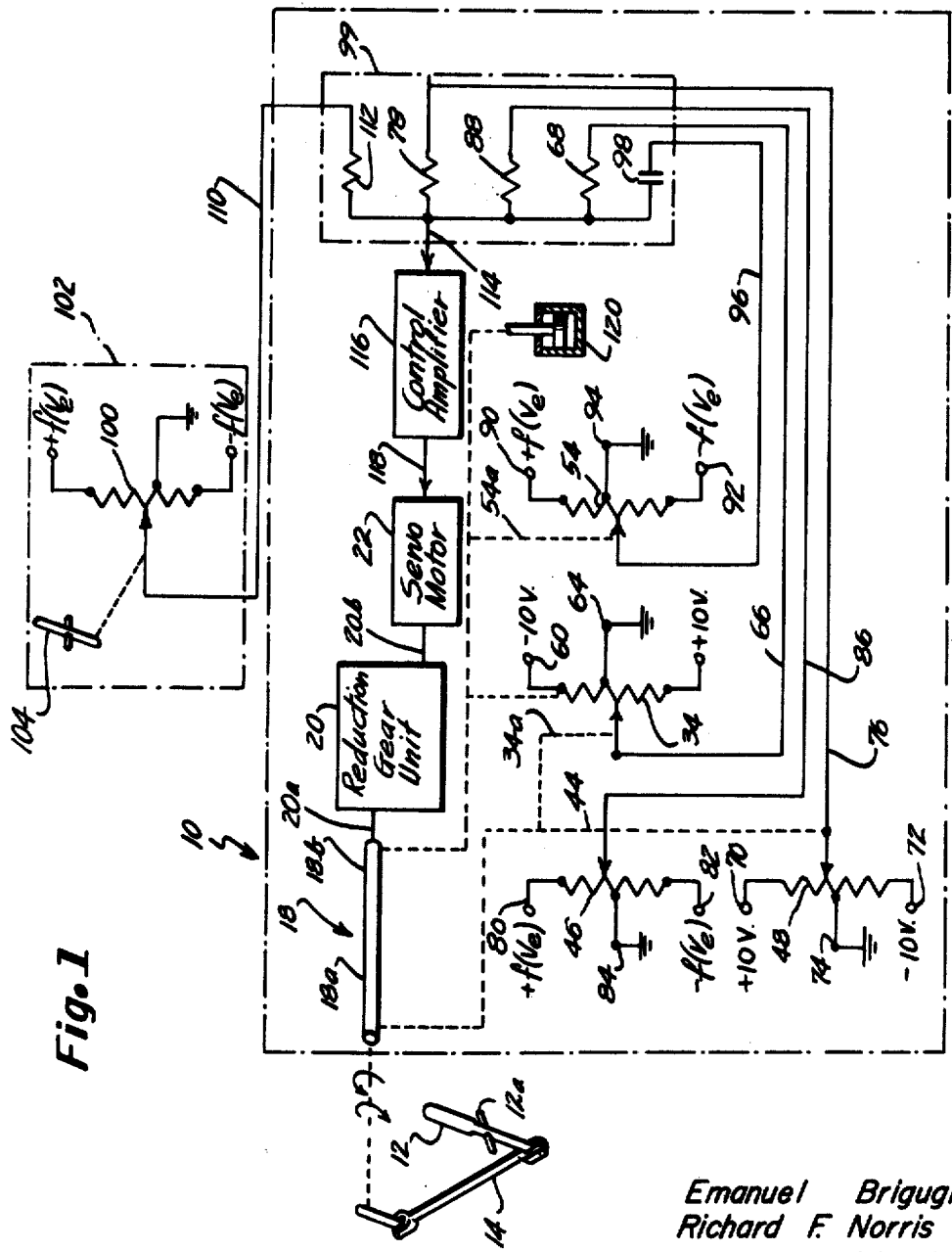
FIG. 1 is a diagrammatic illustration of a variable force control loading system embodying the invention for use in an aircraft simulator.

In the form of the invention illustrated in the drawings and described hereinafter, there is provided a variable force control loading system, generally indicated at 10 in FIG. 1, which responds to forces applied to and movements of a control stick 12 which, in the present example, simulates a control member for the ailerons of a simulated aircraft. Thus, the system 10 may be considered to be part of a larger system such as an operational flight trainer having other control members for simulating control of other flight control surfaces such as elevators, rudder, wing flaps, and the like, and which other control members would each have a loading system similar to the system 10 about to be described.

Figure 2:
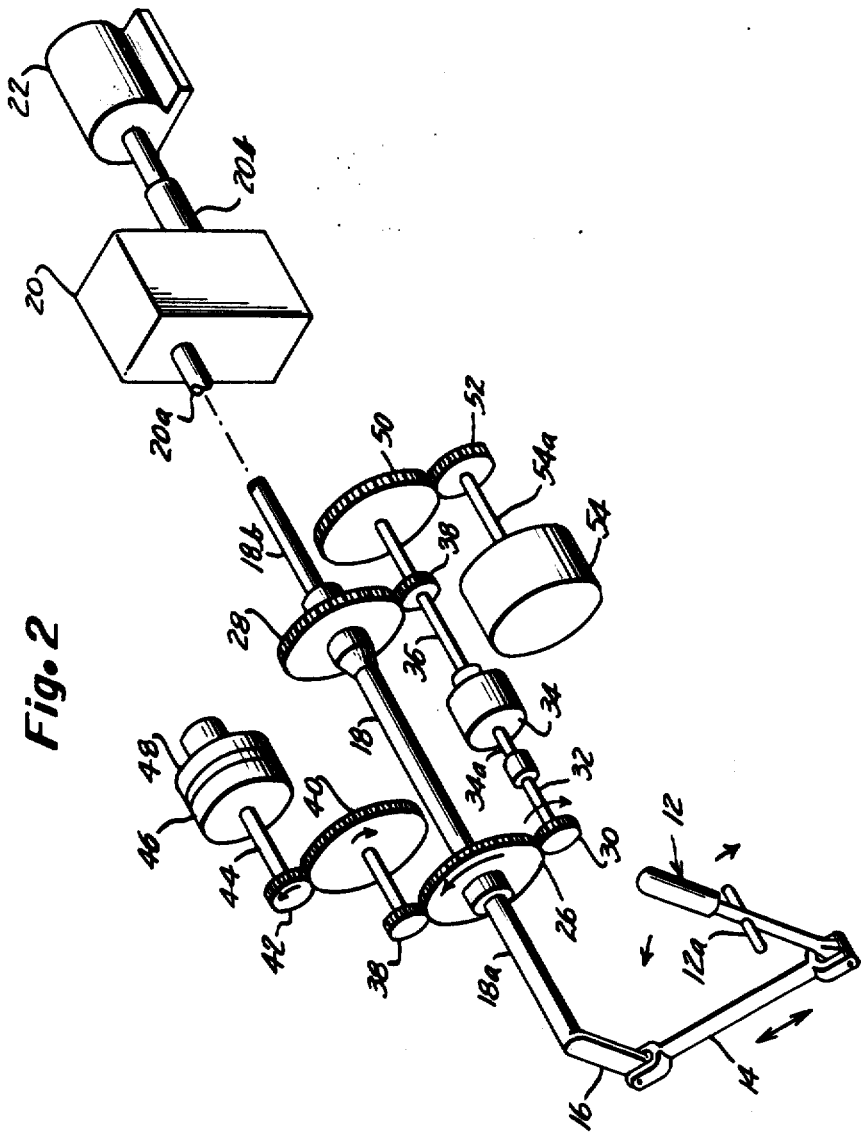
FIG. 2 is a perspective, diagrammatic illustration of mechanical portions of the system of FIG. 1.

The control stick 12 is connected by suitable linkage including a rod 14 and crank arm 16 to one end 18a of a torsion bar 18. The stick 12 is pivoted at 12a to suitable frame means (not shown) for lateral movements such that moving the stick handle to the left as viewed in FIG. 2 will effect counter clockwise rotation of the end portion 18a of the torsion bar 18, whereas movement of the stick handle to the right will effect clockwise rotation of the end portion 18a of the torsion bar.

The other end portion of 18b of the torsion bar is connected to the output shaft 20a of a reduction gear unit 20, the input shaft 20b of which is connected to be driven in one direction of rotation or the other by a reversible servo motor 22. The reduction gear unit 20 conveniently provides a speed reduction on the order of 150 to 1 from the servo motor 22 to the torsion bar end portion 18b so that when the motor 22 is not driving, the torsion bar end portion 18b can be considered to be substantially fixed. That is to say, the application of torque to the torsion bar 18 at the end portion 18a thereof by deflection of the control stick 12 will not act through the gear unit 20 to overrun the motor 22.

Now, when the control stick 12 is deflected, the end portion 18a of the torsion bar 18 will be rotated with respect to the other end portion 18b thereof, resulting in a differential between the rotational positions of the two ends. This differential may be eliminated or decreased either by reducing the deflecting force acting on the control stick 12, or by operation of the servo motor 22 in a direction causing the end portion 18b of the torsion bar to follow the direction in which the end portion 18a was rotated. This, of course, would lessen the force required to maintain the control stick deflection and would affect the "feel" thereof. The present invention includes means for operating the servo motor in response to deflections of the stick 12 in directions and amounts necessary to faithfully simulate at the control stick the forces which a user would feel when operating the corresponding control member on an actual aircraft.

To this end, the torsion bar 18 is mechanically coupled to a plurality of potentiometers, forming part of the system 10, which potentiometers are responsive to the twistings of the torsion bar 18. Thus, referring particularly to FIG. 2, the bar 18 is provided with a drive gear 26 fixed to the end portion 18a thereof and a drive gear 28 fixed to the other end portion 18b thereof.

A driven gear 30 is meshed with the drive gear 26 and is fixed to a shaft 32 which is suitably journalled for rotation. The shaft 32 is drivingly coupled to the wiper shaft 34a of a rotary potentiometer 34. The housing of the potentiometer 34 is fixed to a shaft 36 for rotation therewith by a driven gear 38 which is in meshing engagement with the drive gear 28. It will be evident that the wiper shaft 34a (and hence the wiper) of the potentiometer 34 will be positioned with respect to the body of that potentiometer in accordance with the angle of rotational differential between the end portions 18a and 18b of the torsion bar. The wiper of potentiometer 34 therefore always occupys a position representing the existing deflecting force on the stick 12.

A set of driven gears, including a gear 38 in meshing engagement with the drive gear 26, and intermediate gears 40 and 42, are utilized to couple the common wiper shaft 44 of tandem potentiometers 46 and 48 to the end portion 18a of the torsion bar 18. It will be recognized that the wipers of the potentiometers 46 and 48 will be positioned solely in accordance with deflection of the stick 12 from a predetermined zero of neutral position and irrespective of forces on the stick. These potentiometers 46 and 48 are utilized in the system 10 to provide signals representative respectively of stick deflection and of bungee forces on the stick 12 for purposes which will be made apparent as the specification proceeds.

The shaft 36, which is operated from the end portion 18b of bar 18 by gears 28 and 38, has a gear 50 secured thereto which is in meshing engagement with a gear 52. The latter is fixed to the wiper shaft 54a of a potentiometer 54. It will be evident that the wiper of potentiometer 54 will be operated in one direction or the other as the end portion 18b of the torsion bar is rotated by the servo motor 22. As will presently be made apparent, the potentiometer 54 is utilized to provide a rate signal which serves to oppose oscillations or hunting in the operation of the system 10.

Referring again to FIG. 1, the potentiometer 34 is supplied at opposite end terminals 60, 62 respectively with negative and positive potentials with respect to a center grounded terminal 64, which potentials are representative of the maximum deflecting forces which can be applied to the stick. The wiper of potentiometer 34 is connected by conductor means 66, hereinafter simply referred to as line 66 (a convention which will be followed throughout the specification), to a summing resistor 68. The purpose of this and other summing resistors will presently be made apparent.

The potentiometer 48 is supplied at opposite and terminals 70, 72, respectively, with positive and negative potentials are representative of maximum and minimum bungee forces which are characteristic of the aircraft being simulated. The wiper of potentiometer 48 is connected by a line 76 to a summing resistor 78.

The potentiometer 46 has its end terminals 80, 82 respectively supplied with positive and negative potentials with respect to a grounded center terminal 84, which potentials are functions of the simulated airspeed of the simulated aircraft. These potentials are generated and supplied to the terminals 80, 82 by a conventional flight computer (not shown) which is programmed with the aerodynamic force and speed characteristics of the simulated aircraft.

The wiper of potentiometer 46 is connected by line 86 to a summing resistor 88.

Similarly, the potentiometer 54 has its end terminals 90, 92 respectively supplied with positive and negative potentials with respect to a grounded center terminal 94, which potentials are a function of the speed of the aircraft, and the wiper of this potentiometer is connected by a line 96 to a capacitor 98.

Yet another potentiometer 100 may be provided as part of a trim control station, generally indicated at 102, wherein a trim control member 104 is connected to position the wiper of the potentiometer 100. The potentiometer 100 also has its end terminals 106, 108 respectively supplied with positive and negative potentials with respect to a grounded center terminal 94, which potentials are a function of the speed of the aircraft, and the wiper thereof is connected by a line 110 to a summing resistor 112.

The summing resistors 68, 78, 88 and 112, and the capacitor 98, which constitute a summing network 99, are all connected to the input line 114 of a control amplifier 116, the output of which is conveyed via line 118 to control the direction and rate of rotation of the servo motor 22. Thus, when the input voltage on line 114, resulting from the collective voltage drops across the summing resistors and capacitor 98 is positive, the amplifier 116 will cause the servo motor 22 to operate through the reduction gear unit 20 in a sense to rotate the end portion 18b in one direction, and when that input voltage is negative the amplifier will cause the servo motor to operate in the opposite sense. The rate of operation of the servo motor 22 will increase and decrease in accordance with increases and decreases in input voltage on the line 114, whether positive or negative. The control amplifier 114 may conveniently be of the solid state, silicon controlled rectifier type.

The zero or normal centered position of the control stick 12 will be determined by setting of the trim control 104. Thereafter, deflection of the stick 12 from its neutral position by application of a control force will produce, through the aforedescribed linkage and gearing, deflection of the wipers of potentiometers 34, 46 and 48 associated with the end portion 18a of the torsion bar 18. The movement of the just mentioned wipers will produce voltage signals of lines 66, 76, and 86 which, when combined in the summing network 99, produce an input voltage on line 114 which will cause the control amplifier 116 to energize the servo motor 22 in a sense which will rotate torsion bar end portion 18b in the same direction as the end portion 18a was rotated. This following action reduces the opposing forces felt at the stick 12 and at the same time will effect movement of the housing of the potentiometer 34 so as to tend to reduce the signal on line 34 which is representative of applied force at the stick or, viewing it another way, representative of the angular differential between the ends of the torsion bar 18. The displacement of the housing of potentiometer 34 continues until the output from the wiper arm thereof equalizes opposing signals from the other potentiometer. At that time the input to the amplifier 116 is nullified and the motor 22 ceases to drive.

The capacitor 98 passes voltage signals termed rate signals which are dependent upon the rate of change of position of the wiper of potentiometer 54 and the input voltages to terminals 90, 92 thereof are applied in a polarity sense such that the rate signals passed by the capacitor tend to oppose or damp control oscillations during those periods of servo motor drive.

The effect of the combined signals from the various potentiometers which are positioned by the linkage and gearing is to provide a variable loading of the control stick 12 in response to movements thereof and in accordance with input potentials to the potentiometers from a flight computer as mentioned earlier. The variable loading results in a particularly realistic simulation of the force/feel characteristics of a control member an actual aircraft. In addition, a minimum clearance, liquid type mechanical damper 120 is preferably connected to the end portion 18b of the torsion bar to further enhance the realism provided by the system. Of course, the system 10 would be substantially duplicated for control members for other control surfaces and the like.

From the foregoing detailed description of a variable force control loading system 10 embodying the invention it will be appreciated that the present invention has achieved the previously stated objects and advantages.

Obviously many modifications and variations of the present invention are possible in the light of the above teachings. It is therefore to be understood that within the scope of the appended claims the invention may be practiced otherwise than as specifically described.

What is claimed is:
1. A variable force servo-system for loading a control member in a simulator apparatus, said system comprising:
 a torsion bar having a first end portion thereof connected to a control member so that deflection of said control member will produce rotation of said first end portion;
 a reversible servo motor having a rotary output shaft;
 reduction gear means connecting said rotary output shaft of said servo motor to a second end portion of said torsion bar so that the latter is rotated at a reduced speed upon operation of said servo motor;

a first potentiometer including a wiper and resistance means having opposite end terminals provided with positive and negative potentials with respect to an intermediate terminal, the potentials being representative of a function of speed of the simulated vehicle;

mechanical means connecting said first potentiometer to said first end portion of said torsion bar so that said wiper is positioned only in accordance with deflection of said control member so as to provide a first voltage signal representative of control member deflection;

a second potentiometer including a wiper and resistance means having opposite end terminals provided with positive and negative reference potentials with respect to an intermediate terminal;

mechanical means connecting said second potentiometer resistance means to one of said end portions of said torsion bar and connecting said second potentiometer wiper to the other of said end portions of said torsion bar so that the position of said second potentiometer wiper with respect to said second potentiometer resistance will be in accordance with any differential in angular rotation between said end portions of said torsion bar so as to provide a second voltage signal representative of said differential, said second voltage signal being always in opposition to said first voltage signal;

summer means connected to said wipers for providing a control signal voltage determined at least in part by the algebraic sum of said first and second voltage signals;

a control amplifier connected to said servo motor and responsive to the polarity and magnitude of said control signal voltage to control the direction and speed of rotation of said servo motor.

2. A variable force servo-system as defined in claim 1 and further comprising:

a third potentiometer including a wiper and resistance means having opposite end terminals provided with positive and negative potentials with respect to an intermediate terminal, the potentials being representative of maximum bungee forces;

mechanical means connecting said third potentiometer to said first end portion of said torsion bar so that the position of said third potentiometer wiper will be in accordance with deflection of said control member so as to provide a third voltage signal representative of a bungee force for each position of said control member; and said summer being connected to said third potentiometer wiper so that said control signal voltage is determined at least in part by the algebraic sum of said first, second, and third voltage signals.

3. A variable force servo-system as defined in claim 1 and further comprising:

a third potentiometer including a wiper and resistance means having opposite end terminals provided with positive and negative potentials which are representative of a function of the speed of the simulated vehicle;

mechanical means connecting said third potentiometer to said second end portion of said torsion bar so that said third potentiometer wiper is positioned at a rate proportional to the rate of rotation of said second end portion so as to provide a third voltage signal representative of said rate;

said summer means including a capacitor connected to said third potentiometer wiper so that said control signal is damped by said third voltage signal.

4. A variable force servo-system as defined in claim 3 and further comprising:

a fourth potentiometer including a wiper and resistance means having opposite end terminals provided with positive and negative potentials which are representative of a function of the speed of the simulated vehicle;

mechanical means connecting said fourth potentiometer to said second end portion of said torsion bar so that fourth potentiometer wiper is positioned at a rate proportional to the rate of rotation of said second end portion so as to provide a fourth voltage signal representative of said rate;

said summer means including a capacitor connected to said fourth potentiometer wiper so that said control signal is damped by said fourth voltage signal.

5. A variable force servo-system is defined in claim 4 and wherein:

said summer means comprises said capacitor and a plurality of summing resistors, one for each of said first, second, and third voltage signals, and a fourth summing resistor; and a fifth potentiometer connected having a wiper connected to said fourth summing resistor, said fifth potentiometer wiper being positioned by a trim control member to provide a fifth voltage signal representative of a trim condition.

6. A variable force servo-system as defined in claim 5, and further comprising:

a mechanical damper connected to said torsion bar.

7. A variable force servo-system as defined in claim 4 and wherein:

said mechanical means for connecting said potentiometers to said end portions of said torsion bar comprises two drive gears, one fixed on each of said end portions, and cooperating driven gear means meshing with each of said drive gears.

References Cited

UNITED STATES PATENTS

| | | | |
|---|---|---|---|
| 2,851,795 | 9/1958 | Sherman | 35—12 |
| 3,024,539 | 3/1962 | Rider | 35—12 |

EUGENE R. CAPOZIO, Primary Examiner

P. V. WILLIAMS, Assistant Examiner